Figure 1:
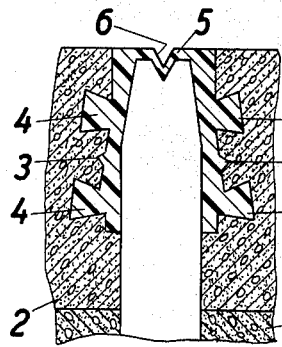

Nov. 23, 1965   J. DAUM   3,218,941
JOINT-FILLING BODIES
Filed Dec. 21, 1961

United States Patent Office 3,218,941
Patented Nov. 23, 1965

3,218,941
JOINT-FILLING BODIES
Josef Daum, Mommsengasse 6, Vienna, Austria
Filed Dec. 21, 1961, Ser. No. 167,459
Claims priority, application Austria, Dec. 30, 1960,
9,824/60
2 Claims. (Cl. 94—18)

This invention relates to joint-filling bodies for joints in composite structures, particularly mass structures, such as concrete roads, runways, linings of basins or the like, which body comprises two cheeks adjoining the walls which define the joint, and bridge means connecting these cheeks and, if desired, anchoring means carried by the cheeks. It is known that joints between the parts of such structure, whether these parts have been made on the site or prefabricated, must be sealed by a joint-filling body to prevent the penetration of water or other substances. The cheeks of the joint-filling bodies have previously been made from a hard elastic material whereas the bridge has been made from a soft elastic material. Anchoring means carried by the cheeks and embedded in the parts of the structure on both sides of the joint were used to afford a firm connection of the joint-filling body to the structure.

In road construction, such joint-filling bodies have proved satisfactory under all weather conditions and traffic loads. It has been found, however, that it is not essential to use materials having different elastic properties for the cheeks and for the bridge, with the attendant increase in cost. Moreover, anchoring means are not essential in all cases although they are almost always recommendable.

A change in the length of the structure, as for example, under the influence of a load or of temperature, will cause a relative displacement of the parts of the structure adjacent to a joint. This displacement must be taken up by the joint-filling body, more particularly the bridge thereof. The deformation of the bridge cross-section resulting from such a displacement will depend on the selected cross-sectional shape and must obviously be reversible. In any case, any reduction of the width of the joint must not cause a portion of the joint-filling body to emerge from the joint, particularly in roads.

The fulfilling of this requirement and substantially the same properties which distinguish the above-mentioned joint-filling body may be achieved at lower costs and with simpler conditions of manufacture when, according to the invention, the cheeks and the bridge or a plurality of bridges provided consist of uniform material, such as rubber, plastic, polyvinylchloride, for example, or other material having a substantially uniform modulus of elasticity throughout the cross-section, and are inseparably connected to form a unit of construction and the bridge disposed close to the edges of the cheeks is arranged to respond to bending stresses by an elastic deformation which virtually precludes a bulging of the bridge above the exposed or top surface of the structure. The elastic deformation in response to bending may be caused by a local weakening of the material in the cross-section of the bridge. The suggested design of the joint-filling body permits of its manufacture in a very simple manner by extruding, without requiring a subsequent treatment of individual parts. Alternatively, the joint-filling body may be made in two parts, each of which comprises one cheek and a portion of the bridge. When these two parts of the joint-filling body have been fitted at adjacent parts of the structure, the two halves of the bridge are interconnected, as for example, by welding. Such a design of the joint-filling body is particularly recommendable in the construction of a structure from prefabricated parts. In this case, the parts of the joint-filling bodies may be incorporated or embedded at the edges of the prefabricated parts during the manufacture thereof.

To prevent the bridge from bulging, the same may be formed with notches or bellows or have a cross-section providing for a suitable distribution of material.

The wall defining the joint must be connected to the joint-filling member in such a manner that a penetration of moisture will be reliably precluded. Whereas such a connection of the cheeks to the adjoining structure can be effected in some cases with the aid of an adhesive, such as in the case of repairs or replacement, it will be desirable or advantageous to provide anchoring means to replace the adhesive bond or be in addition thereto. For this purpose those sides of the cheeks which face the structure may have anchoring means in the form of wings or blades, mounted thereon. Alternatively, such anchoring means may advantageously consist of continuous or interrupted longitudinal ribs which protrude from the surface of the cheeks or are attached to the free longitudinal sides of the cheeks and which consist of the same material as the joint-filling body and have the same elastic properties as the same and can be made by extrusion in one operation with the joint-filling body. The anchoring ribs have a cross-sectional shape by which they cannot be pulled out of the respective part of the structure, as for example, by the provision of at least one undercut surface. Cross-sections having a barb-shaped transverse profile or an enlarged head end will also comply with this requirement. A reliable connection of the anchoring ribs to the structure may also be obtained with the aid of bristlelike projections.

The joint-filling body according to the invention will be explained more fully hereinafter with reference to embodiments shown by way of example in the accompanying drawings, in which FIGS. 1 to 5 and 7 are transverse sectional views showing six joints filled with differently shaped joint-filling bodies.

Figure 5:
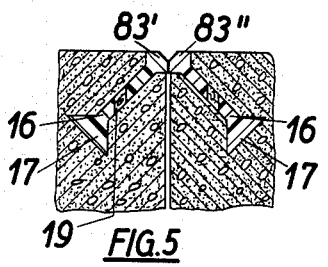
Figure 6:
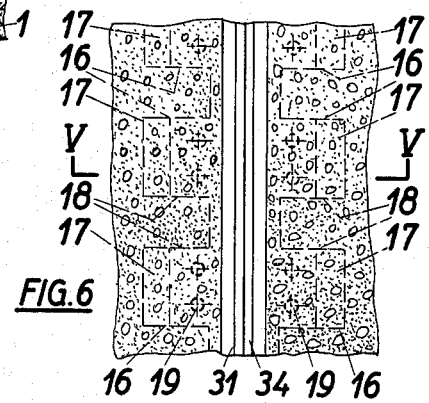

FIG. 6 is a top plan view showing the joint-filling body of FIG. 5.

The joint-filling body shown in FIG. 1 is particularly suitable for expansion joints. The structure constitutes a concrete road composed of parts consisting each of a concrete base layer 1 and a concrete top layer 2 applied thereto. Expansion joints are left between the parts of the structure, the walls of which are bonded to the cheeks 3 of a joint-filling body adjacent to the top concrete. The two cheeks extend substantially parallel to each other and are provided each with two longitudinal anchoring ribs 4 of dovetail section on their surface confronting the parts of the structure. The top longitudinal edges of the cheeks are substantially flush with the road surface and are connected by a bridge 5, which is formed with a centrally extending recess 6 in its top surface and with a centrally extending longitudinal rib 7 on its underside facing the cavity of the joint. The recess and rib define a V-shaped portion with an inward fold having a lower apex. The recess and the rib cross-section have substantially planar sides. The sides of the recess include a smaller angle than the sides of the rib so that the thickness of the bridge decreases from the center toward the edge, in the present case in sections. That is, the central V-shaped portion gradually increases in thickness while the portions projecting from the cheeks and connected to the V-shaped portion have a further increase in thickness. The V-shaped portion has a thickness which is substantially less than that of the cheeks as shown in FIG. 1, and this contributes to the local elastic deformation of the V-shaped portion when the cheeks are displaced relative to one another. The joint-filling body together with the anchoring means consists of one piece.

Figure 2:
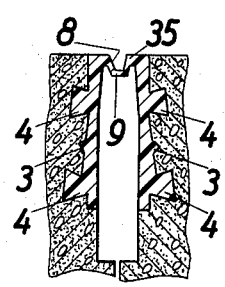

The joint-filling body for the joint, as shown in FIG. 2, is similar to the body described hereinbefore, with the exception of the cross-section of the bridge, and is only smaller in size in view of its purpose. The bridge 35 is formed on its top surface with a trough-shaped central recess 8 of approximately trapezoidal cross-section and on its underside with a corresponding longitudinal rib 9 of trapezoidal cross-section. In this case the central portion of the bridge section has a substantially uniform wall thickness.

Figure 3:
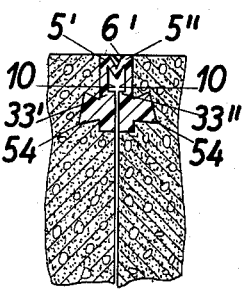

A third example of a joint-filling body according to the invention is shown in FIG. 3 as applied to a compression joint. In such cases the joint-filling body may be smaller in size and consists of two cheeks 33', 33", each of which is integral with one half 5' or 5" of the bridge and is made, for example, by extruding. The two halves of the joint-filling body are separately installed and the two bridge halves are subsequently connected in situ by means of a welded seam. This operation may be performed in a very simple and convenient manner, such as by means of a welding torch or a soldering iron. It may prove desirable to apply additional material as in surfacing. Surfacing material in the form of a "welding wire" is indicated at 6'. Below the bridge, which has the shape shown in FIG. 1, the cheeks have recesses 10 which jointly define a cavity to promote welding through. The structure defining the joint to be filled may consist of prefabricated parts and the parts of the joint-filling bodes are embedded in the prefabricated parts during the manufacture of the latter. When these joint-filling bodies are used in a compression joint, as intended, one anchoring 54 per cheek may be sufficient and may again consist of a longitudinal rib of dovetail section.

Figure 4:
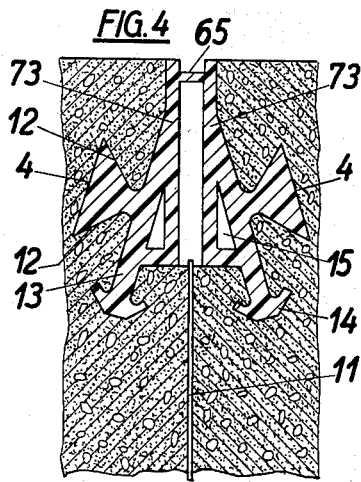

FIG. 4 shows a joint-filling body in a sealed joint. The joint in the structure is stepped and filled with one or more layers 11 of roofing felt adjacent to the wall portions which are closer to each other. One cheek 73 of a joint-filling body is inserted in each of the two parts of the structure adjacent to the top surface thereof. Having a substantially triangular cross-section, each wall is provided with a strong anchoring rib, which is shaped in cross-section to have undercut surfaces 12 and ensures a reliable connection. To improve the anchorage in the structure, the cheeks are provided on their underside with projections 13, which terminate in a head 14 having an arrow-shaped section. To save material, cavities 15 are formed in both cheeks. The single bridge 65 is disposed close to the top surface but need not be flush therewith and consists of a relatively thin strip of uniform cross-section.

A joint-filling body according to FIGS. 5 and 6 is suitable for surface coverings, which are not subjected to such heavy loads such as road surfaces or the like and which are intended for floor coverings consisting of prefabricated parts and used in factory sheds, corridors and so forth. The joint-filling body consists of two narrow cheeks 83', 83", each of which is integral with one bridge portion, which forms virtually a portion of the cheek. The cheeks are embedded in the prefabricated parts during the manufacture thereof and when the prefabricated parts have been laid in position the cheeks are connected to form the joint-filling body by welding or adhesively connecting the bridge halves. Oblique anchorings 18 protruding from each cheek consist of a rib 16 having interruptions and provided at its end with an enlarged head 17 of triangular cross-section. Recesses 19 ensure a better connection of the anchorings to the concrete of the prefabricated parts.

Figure 7:
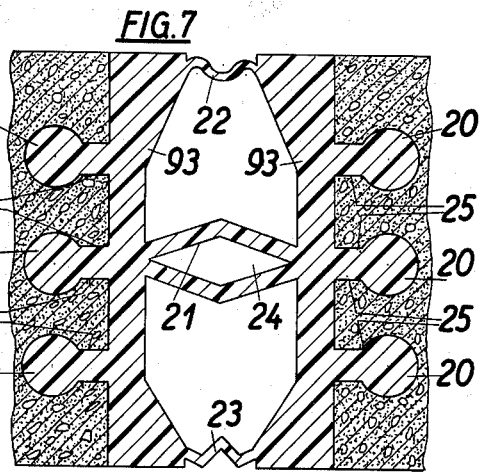

In FIG. 7, a joint-filling body for a sealed joint formed in a large container and sealed on both sides is shown. This joint-filling body extends throughout the thickness of the parts of the structure and is arranged to take up relatively large movements. The joint-filling body designed for this purpose comprises two substantially parallel cheeks 93, which are enlarged toward the edge of the joint. Each cheek is provided with anchoring means consisting of three parallel longitudinal ribs 25 having an end bead 20. The bridge means comprises an intermediate bridge 21 and two bellows-shaped end bridges 22 and 23, the cross-sections of which are defined by continuously curved or serrated lines, as is represented by the bridges 22 and 23, respectively. The intermediate bridge consists of two parts and confines a cavity 24 in order to save material and to minimize the resistance opposing the movement of the cheeks.

In such joint-filling bodies and in joint-filling bodies having other cross-sectional shapes, it may be advantageous to connect the cheeks to the parts of the structure by an at least locally provided adhesive bond, mainly for sealing, instead of or in addition to effecting this connection by anchoring means. In the joint-filling body shown in FIG. 6, such an adhesive bond might be provided at that cheek portion which is disposed between the outermost anchoring means and the top surface of the structure.

An improved seal as well as an improved mechanical connection may be achieved if the respective portions of the cheek surfaces facing the structure are roughened or sand, fine gravel, metal chips or the like are embedded in said portions at least at the surface.

It is a feature of the invention that joint-filling bodies made by extruding are provided with such rough surface portions by embedding sand grains, metal chips or the like at least locally in the surface of the cheeks immediately after they emerge from the die of an extruder and when the cheeks are still warm.

The embedding of the grains of sand may be effected with the aid of a jet of warm or hot air, which entrains said particles and throws them against the respective cheek portions whereby the same are heated at the same time or are at least maintained at a temperature which will permit of a partial penetration and of an adhesion of the particles. Such a design of those cheek surfaces which face the parts of the structure or of portions of such cheek surfaces may eliminate the need of any other anchoring means.

I claim:

1. A joint-filling body for filling a gap between adjacent parallel surfaces, said joint-filling body comprising two substantially parallel cheeks having side faces adapted to engage respective surfaces for the entire length of the said cheeks, means connecting said cheeks together solely at one extremity thereof and leaving the remainder of the cheeks free and independent of one another, said means comprising a bridge portion including first portions extending from each cheek at said one extremity substantially perpendicular to the cheek and a V-shaped portion connected to said first portions, said V-shaped portion defining an included acute angle, said V-shaped portion having an apex remote from the extremities of the cheek and disposed between the cheeks, said V-shaped portion having tapered legs with increasing thickness from the apex towards said first portions, said V-shaped portion having a thickness substantially less than that of said cheeks, and a plurality of anchoring ribs disposed in spaced relation along the length of each cheek and extending therefrom and adapted for being embedded in said surfaces, said ribs having opposed inclined surfaces which diverge in a direction away from the cheeks, said cheeks, ribs and bridge portion being an integral one-piece body of generally inverted U-shape and constituted of uniform resilient material having a substantially uniform modulus of elasticity.

2. A body as claimed in claim 1 wherein said cheeks have inner faces which are opposite said side faces, said inner faces tapering away from the side faces from an intermediate location on the cheeks to said first portions of the bridge portion to provide increasing thickness for the cheeks from said intermediate location to said first portions, one of said anchoring ribs on each cheek being disposed in the portion of increasing thickness thereof.

References Cited by the Examiner
UNITED STATES PATENTS

| | | | |
|---|---|---|---|
| 1,701,628 | 2/1929 | Pullar | 94—18.2 |
| 2,156,681 | 5/1939 | Dewhirst | 94—18.2 |
| 2,368,650 | 2/1945 | Fischer | 94—18.2 |
| 2,431,386 | 11/1947 | Fischer | 94—18 |
| 2,577,998 | 12/1951 | Carter | 94—18 |
| 2,579,467 | 12/1951 | Brickman | 94—1.5 |
| 2,619,884 | 12/1952 | Jacobson | 94—18 |
| 2,700,329 | 1/1955 | Carter | 94—18 |
| 2,937,065 | 5/1960 | Harza | 94—18.2 |
| 2,964,419 | 12/1960 | Link | 117—16 |
| 2,978,349 | 4/1961 | Walsh | 117—16 |
| 3,068,763 | 12/1962 | Harza | 94—18.2 |

FOREIGN PATENTS

| | | |
|---|---|---|
| 1,198,881 | 6/1959 | France. |
| 1,248,986 | 11/1960 | France. |
| 504,570 | 4/1939 | Great Britain. |

CHARLES E. O'CONNELL, *Primary Examiner.*
JACOB L. NACKENOFF, *Examiner.*